United States Patent Office 3,344,516
Patented Oct. 3, 1967

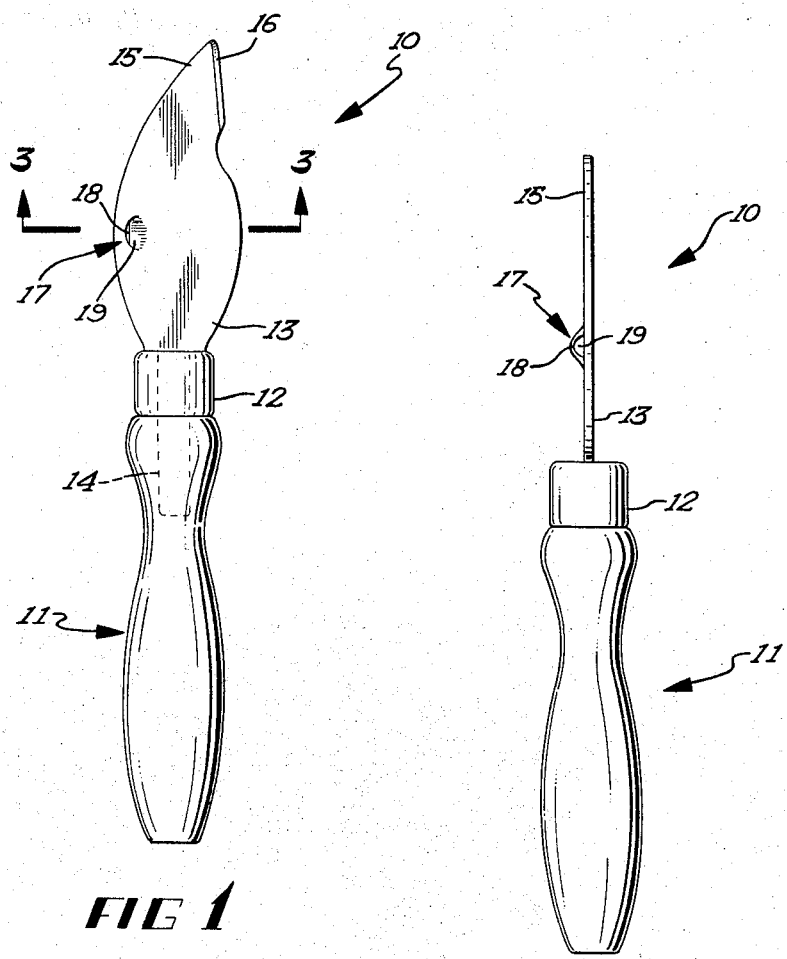

3,344,516
KNIFE FOR REMOVING SKIN FROM CITRUS
FRUITS AND THE LIKE
Lloyd S. Officer and I. D. Caples, Brooklyn Park, Minn.,
assignors to C. & O. Industries, Brooklyn Park, Minn.
Filed July 20, 1966, Ser. No. 566,567
1 Claim. (Cl. 30—24)

ABSTRACT OF THE DISCLOSURE

A fruit peeler implement for removing the rind from citrus fruit comprising a handle having an elongate blade secured thereto and projecting longitudinally therefrom. Said blade being substantially flat and having longitudinal edges flaring outwardly from the handle to a central portion and thereafter converging to a pointed end portion, one of the longitudinal edge portions of the blade adjacent the point being sharpened to define a cutting edge. An arcuate peel removing cutting element struck downwardly from the plane of the blade and having a cutting edge facing oppositely from the first-mentioned cutting edge.

---

This invention relates to a hand type cutting implement and more specifically to a hand type cutting implement which is especially adapted for use in peeling or removing the skin from citrus fruit and the like.

There are currently available many kinds of paring knives or the like, for use in paring or removing the skin from various kinds of fruit and vegetables. These prior art paring knives are adapted to remove the skin from thin skinned fruit or vegetables and are not specifically adapted for removing skin from citrus fruit and the like.

It is an object of the present invention, to provide a knife or implement, of simple and inexpensive construction, which is especially adapted for removing the skin from citrus fruit and the like.

A more specific object of this invention, is to provide a knife which is especially adapted to remove the skin from citrus fruit, and which includes a blade having an arcuate cutting element for first removing a single narrow strip from citrus fruit. The blade being arranged and constructed so that a user may remove the two halves of skin intact from the citrus fruit.

These and other objects and advantages of this invention will more fully appear from the following description made in connection with the accompanying drawings wherein like reference characters refer to the same or similar parts throughout the several views, and in which:

FIG. 1 is a plan view of the knife device;
FIG. 2 is a side elevational view thereof;
FIG. 3 is a cross-sectional view taken approximately along line 3—3 of FIG. 1 and looking in the direction of the arrows.

Referring now to the drawing, it will be seen that one embodiment of the novel knife device, designated generally by the reference numeral 10, is there shown. This knife device includes an elongate handle 11 which may be formed of any suitable rigid material such as wood and the like. An annular collar 12 is applied to one end of the handle for the purpose of preventing splitting of the end of the handle, when the blade is applied thereto.

The knife device 10 also includes a substantially flat blade 13 preferably constructed of suitable metallic material, such as stainless steel or the like, and having an elongate shank 14 integrally formed with one end thereof, and which is embedded in one end of the handle 11 to very rigidly secure the handle and blade together. It will be noted that the longitudinal edges of the blade flare outwardly from the handle and thereafter taper to a substantially pointed end portion 15. One of the longitudinal edges adjacent the pointed end portion of the blade defines a cutting edge 16 which extends from the pointed end of the blade and terminates substantially short of a line drawn transversely through the mid-portion of the blade.

The blade 13 also includes an arcuate shaped cutting element 17 integrally formed with the mid-portion thereof as best seen in FIGS. 2 and 3. This arcuate shaped cutting element 17 includes an arcuate leading cutting edge 18 and an arcuate inclined guiding portion 19, as best seen in FIG. 3. It will be noted that this arcuate shaped cutting element 17 is actually struck downwardly from the plane of the blade 13 adjacent the mid-portion thereof, which constitutes the widest part of the blade. The inclined portion 19 of the cutting element 17 extends upwardly and rearwardly from the cutting edge 18 thereof and is continuous with one flat face of the blade 13.

In use, the knife device 10 is applied to citrus fruit to remove a narrow strip of skin from the central portion of the citrus fruit to thereby form a narrow annular groove in the skin. In forming this narrow groove in the fruit skin, the arcuate shaped cutting element 17 cuts and removes a continuous strip of the skin preferably adjacent the mid-portion of the fruit. When a circular cut is made only the skin or rind will be removed and the fruit will remain undamaged. As the blade is moved along the citrus fruit to make the circular cut in the rind, the single continuous strip of rind will be guided upwardly by the arcuate inclined guiding portion 19 and along the wide part of one face of the blade. The ring of skin of the fruit is then separated into two halves when the circular cut is made.

After such a groove has been formed in the citrus fruit, the pointed end portion 15 may be inserted below the skin or rind covering one-half of the fruit, and the blade or the fruit is then moved in a circular fashion so that the cutting edge 16 is forwardmost. It will be noted that when the blade is moved in this direction, the cutting edge 18 is disposed in trailing relationship with respect to the direction of movement of the blade 13. The wide central portion of the blade 16 serves to hold the skin away from the inner surface of the fruit and to stretch the same thereby permitting quick and easy loosening and removal of the skin or rind from the citrus fruit in intact condition. It is pointed out that after the two respective halves of skin are removed from each fruit, these skin halves may be re-applied loosely to form a removable protective covering. The rind may be re-applied to the fruit when, for example, the fruit is packed in a lunch box or the like and is not to be eaten immediately upon removing the skin therefrom. The knife device 10 is of relatively small size and can be easily carried with other small serving utensils such as knives, forks, spoons and the like. It will be noted that the blade 13 is of unitary one piece construction in which the pointed end portion 15 permits insertion between the skin and the inner covering of the fruit while the cutting edge 16 facilitates loosening and separation of the skin from the fruit. The wide mid-portion of the blade also facilitates stretching of the fruit skin as it is being loosened, while the arcuate shaped cutting elements 17 permit ready removal of a strip of skin from the fruit to form a circular groove in the skin. The cutting edges 18 and 16 are oppositely facing so that when one cutting edge 16 is used for cutting or separating the skin from the fruit, the other cutting edge will be in trailing relation thereto.

From the foregoing description, it will be seen that we have provided a novel knife device, which is capable of readily removing the skin from citrus fruits in a three step operation, wherein a strip of skin is first removed from the central portion of the citrus fruit, and the two remaining halves of skin are thereafter removed from the fruit in substantially intact condition.

Thus, it will be seen that we have provided a novel knife device which is not only of simple and inexpensive construction, but one which functions in a more efficient manner than any heretofore known comparable device.

It will, of course, be understood that various changes may be made in the form, details, arrangement and proportions of the various parts without departing from the scope of our invention.

What we claim is:

An implement for removing the rind from citrus fruit and the like, said implement comprising an elongate handle, an elongate blade secured to one end of said handle and projecting outwardly therefrom, said blade being substantially flat and having longitudinal edges flaring outwardly from the handle to a central portion and thereafter converging to a pointed end portion, one longitudinal edge portion of said blade adjacent said pointed end portion being sharpened to define a straight cutting edge disposed parallel to the longitudinal axis of the implement, an arcuate cutting element integrally formed with and being struck from the general plane of said blade adjacent but spaced inwardly from one longitudinal edge of said blade, said one longitudinal edge being arcuately curved throughout its length and presenting an uninterrupted continuous convex edge surface, said arcuate cutting element having a cutting edge facing oppositely of said first cutting edge, and having an inclined guide portion extending from said cutting edge and being continuous with one flat surface of said blade at a point located on that side of the vertical longitudinal center line plane of the implement positioned closest adjacent to said uninterrupted continuous convex edge surface.

References Cited

UNITED STATES PATENTS

| | | | |
|---|---|---|---|
| 2,522,054 | 9/1950 | Novak | 30—24 |
| 2,900,717 | 7/1959 | Byrd et al. | 30—24 |

FOREIGN PATENTS

| | | |
|---|---|---|
| 535,189 | 2/1955 | Belgium. |
| 324,240 | 1/1930 | Great Britain. |
| 287,160 | 11/1952 | Switzerland. |

OTHELL M. SIMPSON, *Primary Examiner.*

G. WEIDENFELD, *Assistant Examiner.*